United States Patent
Hart et al.

(10) Patent No.: US 12,385,791 B2
(45) Date of Patent: Aug. 12, 2025

(54) RAYLEIGH-RAMAN POLYCHROMATIC LASER GUIDE STAR

(71) Applicant: Arizona Board of Regents on Behalf of the University of Arizona, Tucson, AZ (US)

(72) Inventors: Michael Hart, Tucson, AZ (US); Lennon Reinhart, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 519 days.

(21) Appl. No.: 17/758,933

(22) PCT Filed: Oct. 28, 2020

(86) PCT No.: PCT/US2020/057653
§ 371 (c)(1),
(2) Date: Jul. 15, 2022

(87) PCT Pub. No.: WO2021/145936
PCT Pub. Date: Jul. 22, 2021

(65) Prior Publication Data
US 2023/0055616 A1  Feb. 23, 2023

Related U.S. Application Data

(60) Provisional application No. 62/962,652, filed on Jan. 17, 2020.

(51) Int. Cl.
*G01J 9/00* (2006.01)
*G02B 27/14* (2006.01)

(52) U.S. Cl.
CPC .............. *G01J 9/00* (2013.01); *G02B 27/14* (2013.01)

(58) Field of Classification Search
CPC .................................. G01J 9/00; G02B 27/14
(Continued)

(56) References Cited

U.S. PATENT DOCUMENTS 8,076,624 B1 * 12/2011 Barchers ............... F41H 13/005
356/512
8,575,528 B1 * 11/2013 Barchers ............... G01S 7/4815
356/521

(Continued)

OTHER PUBLICATIONS

Angel, R. and Lloyd-Hart, M., \Atmospheric tomography with Rayleigh laser beacons for correction of wide fi?elds and 30-m-class telescopes, in [Astronomical Telescopes and Instrumentation], (2000).

(Continued)

*Primary Examiner* — Tarifur R Chowdhury
(74) *Attorney, Agent, or Firm* — Perkins Coie LLP

(57) ABSTRACT

Methods, devices and systems are described that enable improved determination of wavefront errors associated with light traveling through turbulent media, such as through the atmosphere. The described systems use a Rayleigh-Raman polychromatic laser guide star (RRPLGS) to measure the tilt at the wavelength of observation by making use of the dispersion of the refractive index of air and differential tilt measurements at multiple combinations of wavelengths based on the Rayleigh and Raman back-scattered light. The described RRPLGS systems have a number of advantages, including scalability of returned flux and flexibility in selection of short wavelengths, allowing for a combination of multiple tilt measurements, and enabling characterization of the turbulent media without relying on photons from the object of interest.

20 Claims, 8 Drawing Sheets

(58) Field of Classification Search
USPC .......................................................... 356/342
See application file for complete search history.

(56) References Cited

U.S. PATENT DOCUMENTS

| | | | |
|---|---|---|---|
| 10,241,052 B1 | 3/2019 | Davis | |
| 11,156,503 B2* | 10/2021 | Hart | ............................ G01J 9/00 |
| 2007/0077071 A1* | 4/2007 | Belenkiy | ................. G01S 17/95 398/130 |
| 2012/0274937 A1* | 11/2012 | Hays | ........................ G01S 17/95 356/450 |
| 2013/0265399 A1 | 10/2013 | Baranec et al. | |

OTHER PUBLICATIONS

Bischel, W. K. and Black, G., \Wavelength dependence of Raman scattering cross sections from 200-600 nm, AIP Conference Proceedings 100(1), 181{187 (1983).

Foy, R., Migus, A., Biraben, F., Grynberg, G., McCullough, P. R., and Tallon, M., \The polychromatic arti?cial sodium star: a new concept for correcting the atmospheric tilt., 111, 569 (Jun. 1995).

Happer, W., et al., "Atmospheric-turbulence compensation by resonant optical backscattering from the sodium layer in the upper atmosphere," J. Opt. Soc. Am. A/vol. 11, No. 1, 1994.

International Search Report and Written Opinion mailed Jan. 28, 2021 for International Patent Application No. PCT/US20/57653.

Penney, C. M., Peters, R. L. S., and Lapp, M., \Absolute rotational Raman cross sections for N2, O2, and CO2, J. Opt. Soc. Am. 64, 712{716 (May 1974).

Reinhard, Lennon O., "Theoretical Analysis of a Rayleigh-Raman Polychromatic Laser Guide Star," 6th International Conference on Adaptive Optics for Extremely Large Telescopes, 2019.

Schock, M., Foy, R., Tallon, M., Noethe, L., and Pique, J. P., \Performance analysis of polychromatic laser guide stars used for wavefront tilt sensing, 337, 910{920 (Dec. 2002).

Thompson, L. A. and Gardner, C. S., \Excimer laser guide star techniques for adaptive imaging in astronomy, in [Active Telescope Systems], Roddier, F. J., ed., 1114, 184{190 (Sep. 1989).

Tyler, G. A., "Bandwidth considerations for tracking through turbulence," Journal of the Optical Society of America A 11, 358{367 (Jan. 1994).

Willitsford, A., Resonance Raman Spectroscopy in the Ultraviolet using a Tunable Laser, PhD thesis, Penn. State University (2008).

\* cited by examiner

RAYLEIGH-RAMAN POLYCHROMATIC LASER GUIDE STAR

CROSS-REFERENCE TO RELATED APPLICATIONS

This patent document is a 371 National Phase Application of International Patent Application No. PCT/US2020/057653, filed Oct. 28, 2020, which claims priority to the provisional application with Ser. No. 62/962,652, titled "Rayleigh-Raman Polychromatic Laser Guide Star," filed Jan. 17, 2020. The entire contents of the above noted applications are incorporated by reference as part of the disclosure of this document.

TECHNICAL FIELD

The disclosed technology relates to imaging systems and particularly to methods and devices that enable an improved determination of wavefront errors.

BACKGROUND

Natural stars can serve as point sources for measuring and correcting wavefront errors caused by atmospheric turbulence in optical systems that look through the atmosphere, but sufficiently bright stars are not available in all parts of the sky. Instead, a laser guide star (LGS), which is an artificial star image created by projecting a laser beam into the atmosphere, is often used for this purpose. Light from the laser beam is scattered by the components in the atmosphere and is received by the optical system. LGS is typically used in systems that implement adaptive optics (AO), such as large telescopes, to correct atmospheric distortion.

SUMMARY

The disclosed embodiments relate to methods, devices and systems that enable improved determination of wavefront errors associated with light traveling through turbulent media, such as through the atmosphere or under water. One example method for determining wavefront tilt in a system that utilizes a laser guide star includes projecting one or more laser beams in a direction of an object of interest, each laser beam forming a Rayleigh-Raman polychromatic laser guide star (RRPLGS), receiving light associated with the one or more laser beams after undergoing Rayleigh and Raman scattering through a region of atmosphere, separating spectral components of the received scattered light to obtain at least one Rayleigh-scattered component and at least one Raman-scattered component, using one or more sensors to determine a wavefront error associated with the at least one Rayleigh-scattered component and the at least one Raman-scattered component, and determining an estimate of the wavefront tilt based on a combination of the wavefront errors determined for the Rayleigh-scattered and the Raman-scattered components.

DETAILED DESCRIPTION

Figure 1:
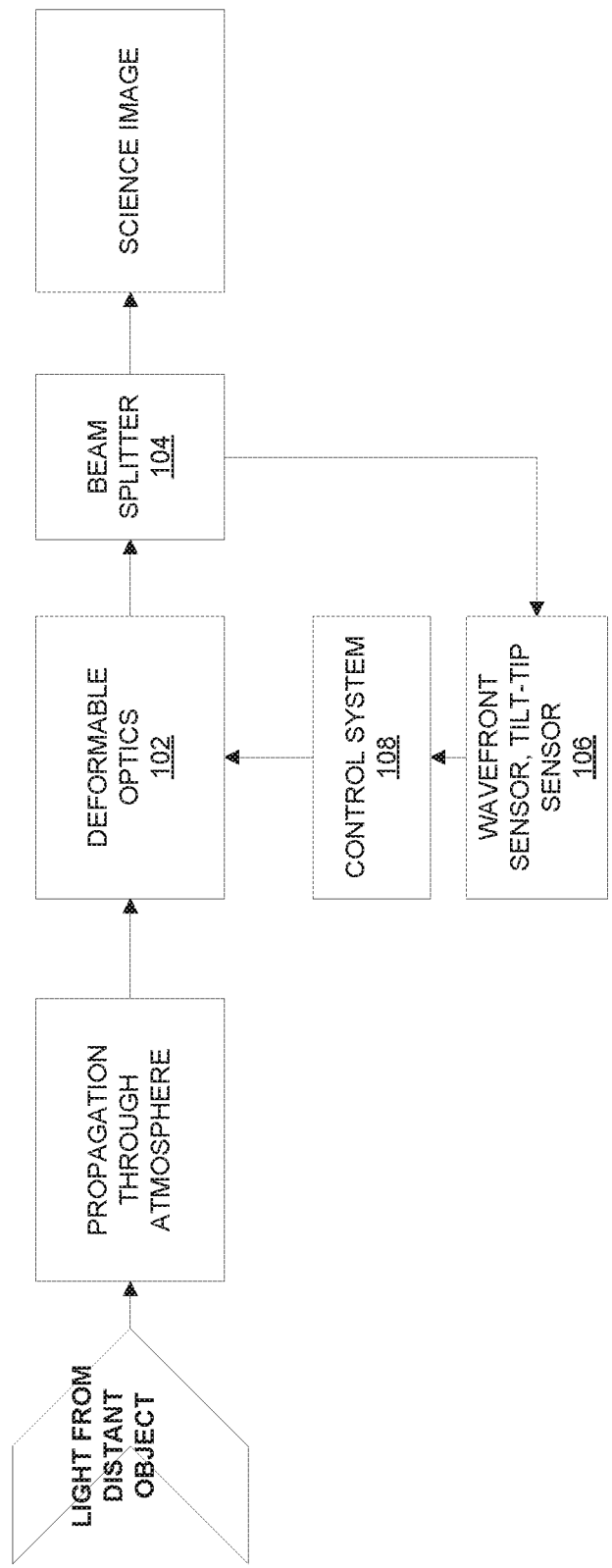
FIG. 1 illustrates a block diagram of a typical adaptive optics (AO) system in a telescope.

As noted earlier, a laser guide star (LGS) is an artificial star image created that is often used in systems that implement adaptive optics (AO) systems, such as large telescopes, to correct atmospheric distortion. FIG. 1 illustrates a high-level block diagram of an adaptive optics (AO) system in a telescope. The light from a distant object of interest (sometimes referred to as the "science target" or "science object") after traveling through the atmosphere is received by the AO system's deformable optics 102, such as a set of deformable mirrors, that is configured to impart corrections to the received wavefront under the control of a control system 108 (including, e.g., piezo devices, electronics, microprocessors, etc.). The corrected wavefront is used to produce an image of the object of interest (i.e., the "science image"). The corrected wavefront produced by the deformable optics 102 is also provided to a wavefront sensor (WFS) 106 through a beam splitter 104. One example wavefront sensor is a Shack-Hartmann sensor that includes an array of identical lenslets focused onto a CCD or a CMOS sensor, which allows the determination of the local tilt of the wavefront across each lens from the position of the focal spot on the sensor. Other wavefront sensors, such as a pyramid wavefront sensor, can be additionally or alternatively used. In some implementations, a tilt-tip sensor (TTS) may be additionally or alternatively used to enable measurement of lower order tilt measurements. An example of a TTS is a quad detector.

Referring again to FIG. 1, the wavefront error measured by the WFS (and/or TTS) 106 is fed back to the deformable optics 102 via the control system 108 that implements suitable control algorithms to effectuate the corrections that compensate for the atmospheric turbulence. The WFS requires a reference light source that is sufficiently bright to provide the proper signal-to-noise ratio (SNR). This wavefront reference source of light is often referred to as a guide star. Natural stars can serve as point sources for this purpose, but sufficiently bright stars are not available in all parts of the sky. Artificial guide stars can instead be created by projecting a laser beam into the atmosphere. Light from the laser beam is scattered by the components in the atmosphere back into the receiving optics. This way, an LGS can be positioned anywhere in the sky, thus expanding the use of adaptive optics systems to a much larger extent of the sky.

There are several differences between the signals that are obtained from a natural star and those obtained from a laser beacon of an LGS. One of the critical differences is that wavefront tilt, which is a significant portion of the aberrations caused by turbulence inherent in the atmosphere, cannot be properly measured by an LGS. Existing tilt measurement systems are dependent on the object being viewed and require light from a source that traverses the medium in a single pass as a tilt measurement reference, such as a natural guide star or the object itself. In systems that rely on an LGS, due to the double pass nature of the reference light (i.e., the laser beam passes twice through the atmosphere: on its way up and the back down after being scattered), the overall image motion, which is induced by the global wavefront tilt (e.g., the mean tilt of the wavefront over the aperture of the receiving telescope), cannot be properly obtained. That is, the laser beacon travels in an upward path in an unknown way, and lacking a sensor in the sky, one cannot determine how the beam has moved. As a result, the image motion that is sensed based on an LGS represents the difference between the motion of the beam on the way up, and the beam on the way down, which cannot be used to properly measure the tilt. This is a serious problem because tilt is a major contributing factor to the wavefront aberration: specifically, two-axis tilt makes up roughly 87% of the phase variance of the aberration induced by Kolmogorov turbulence.

Currently, two types of LGS systems are commonly used. Elastic scattering of the light (or generally the electromagnetic radiation) by the particles in the atmosphere that are smaller than the wavelength of radiation gives rise to so-called Rayleigh LGSs, or Rayleigh beacons. The Rayleigh back-scattered light has substantially the same wavelength as the incident laser light. The photon return from a Rayleigh LGS depends on the density of the molecules in the atmosphere, and therefore, as the altitude increases, the detection of the back-scattered light decreases. As a result, the useful range of existing Rayleigh beacons is limited to about 30 km above sea level, although such a range can be increased by deploying more powerful lasers. The other commonly used method for creating an LGS produces a sodium guide star by stimulating emission from a thin layer of sodium atoms positioned between 80 and 100 km above the Earth's surface. Aside from the limited wavelength range of sodium LGS (strongest return from the D2 line is centered at 589 nm), the returns from the sodium LGSs depend on many factors and can change significantly on a night-to-night basis.

Polychromatic laser guide stars (PLGS) can enable tilt correction that is independent of the object being viewed and natural guide stars. PLGS rely on atmospheric dispersion and the assumption that the multiple wavelengths from the guide star come from the same limited region in space. Existing research on PLGS has focused on polychromatic sodium LGS (PSLGS). The disclosed embodiments, among other features and benefits, overcome the shortcomings of the prior systems and enable an improved determination of the wavefront tilt in an LGS system. The disclosed embodiments rely on a different type of LGS, namely, Rayleigh-Raman polychromatic laser guide stars (RRPLGS). Raman scattering is inelastic, and unlike Rayleigh scattering, results in returned signals that differ in wavelength from the beacon signal. In accordance with the disclosed embodiments, tilt measurements can be conducted based on the Rayleigh-scattered (elastic) signal having the same wavelength as the laser beacon, in conjunction with measurements from Raman-scattered (inelastic) signals that are shifted to one or more wavelengths that differ from the laser wavelength.

The disclosed embodiments based on RRPLGS have a number of advantages, including scalability of returned flux and flexibility in selection of short wavelengths, allowing for a combination of multiple tilt measurements. Notably, the disclosed embodiments utilize measurements associated with at least two different returned wavelengths associated with the same laser beacon that are produced via two different scattering processes: Rayleigh and Raman scattering. In this way, not only is the double-pass problem removed, but there is also no ambiguity that the two or more return signals correspond to the back-scattered light from the same point in the sky because those differing wavelengths are produced using the same laser beacon. Additional lasers can further be used to improve the reliability or confidence in the measured tilt values. The disclosed RRPLGS techniques are applicable to all sizes of telescopes, keeping in mind that for large telescopes the cone effect is minimized by assuming a tomographic wavefront sensing system.

The disclosed embodiments can use a Rayleigh-Raman polychromatic LGS (RRPLGS) to measure the tilt at the wavelength of observation by making use of the dispersion of the refractive index of air and differential tilt measurements at multiple combinations of wavelengths based on the Rayleigh and Raman back-scattered lights. More specifically, the dispersion of air allows for an LGS to provide a measurement of the tilt at the wavelength of interest based on tilt measurements at two or more returned wavelengths. The embodiments of the disclosed technology use Rayleigh-Raman scattering LGSs (as opposed to sodium-based LGSs) to measure tilt, which offers more flexibility in implementation and application than the sodium resonance LGSs. For any single laser, there are various Raman backscattering mechanisms that can potentially be leveraged to yield multiple tilt measurements at the wavelength of observation. These multiple tilt measurements from a single laser can be combined for an improved tilt measurement. Further, additional beacons (i.e., additional RRPLGSs) can be implemented to improve the reliability of the measurements using, for example, multiple monochromatic lasers or a supercontinuum laser to produce multiple beacons, each producing an associated set of Rayleigh and Raman-scattered light.

Figure 2:
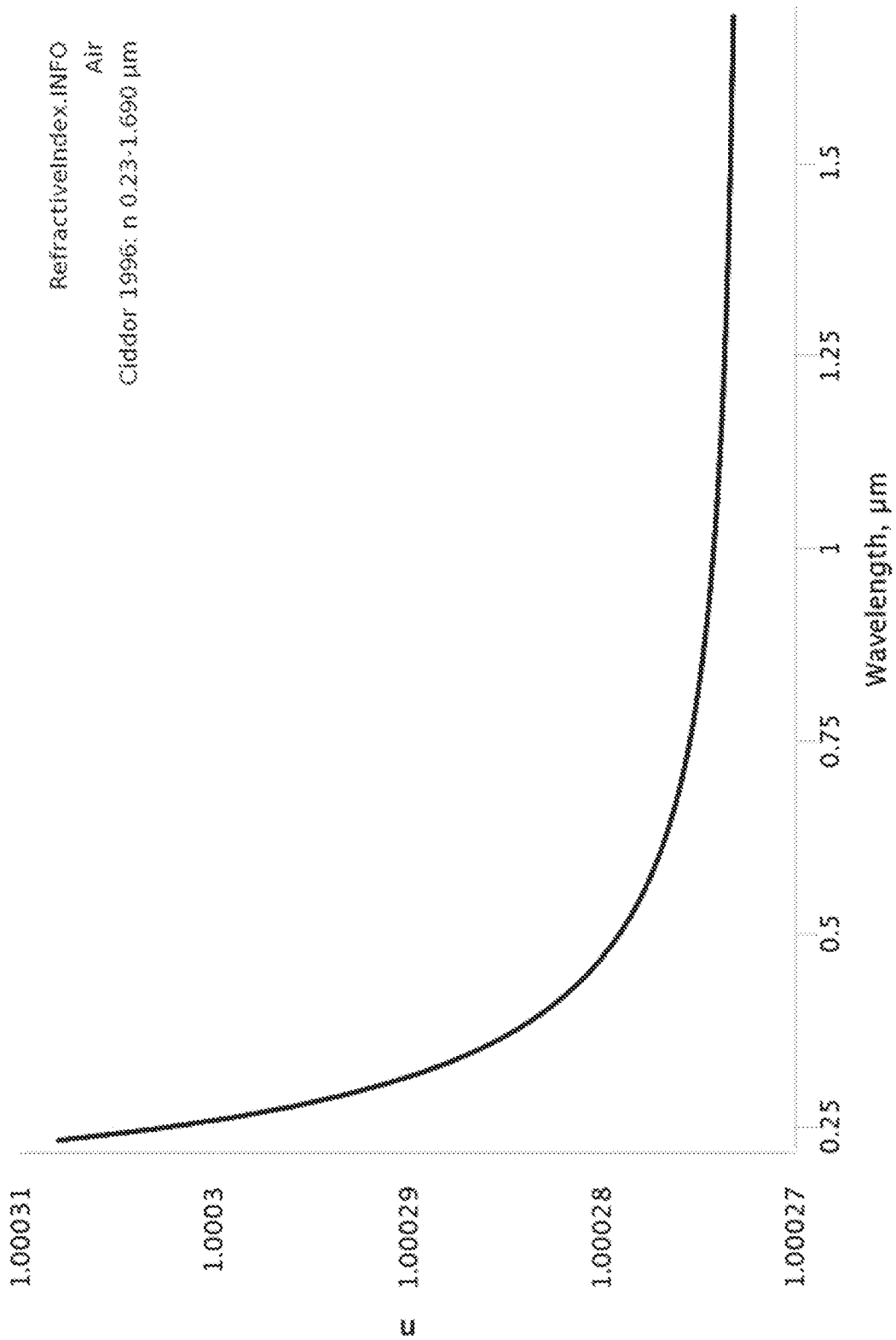
FIG. 2 illustrates an example plot of refractive index of air as a function of wavelength.

To facilitate the understanding of the disclosed technology, it is instructive to note that the refractive index of air (or more generally the medium through which the light travels) is a function of wavelength. When laser beams having two or more different wavelengths are transmitted through the air, they will appear to have moved in the sky by different amounts due to the differences in the index of refraction that each wavelength experiences. Because the dispersion characteristics of the atmosphere are known (see, e.g., the example plot in FIG. 2, illustrating the changes in the index of refraction of air as a function of wavelength), the differences between the apparent motions of the two or more wavelengths (obtained from the measured wavefront errors) can be used to estimate the overall image motion for the object for the light that would have traversed the atmosphere in one direction.

The disclosed embodiments rely on Rayleigh and Raman scattering of one or more laser beams, from primarily nitrogen and oxygen molecules in the atmosphere that do not saturate. That is, more powerful lasers can be used to effectuate brighter LGSs. As noted earlier, measurements conducted on the Rayleigh-scattered light and more than one Raman-scattered light can improve the accuracy of the measurements. Additionally, or alternatively, additional beacons at multiple wavelengths further improves the accuracy of the determination of wavefront error. In some implementations, four, five, or even more beacons with different colors can be used to provide high-resolution images and/or to enable acquisition of images of faint objects having poor signal-to-noise ratios.

The following fundamental relationship can be leveraged to implement the disclosed RRPLGS systems and methods. From the dispersion of the refractive index of air and the separability of wavelength and atmospheric characteristics (e.g., temperature, pressure), the general relationship, $$\theta = \Delta\theta \frac{(n-1)}{\Delta n}, \qquad (1)$$

is derived. All PLGS use this relationship. In Equation (1), $\theta$ is any quantity derived from a linear operation on the wavefront that the imaging system is sensitive to, $\Delta\theta$ is the difference between two measurements of $\theta$ at two separate wavelengths, n is the refractive index at the wavelength of observation, and $\Delta n$ is the difference between the refractive index at the same wavelengths as those in $\Delta\theta$. The proportionality in Equation (1) assumes that the light of different wavelengths reaches a point of observation from paths that are not significantly different from each other.

From this fundamental relationship, RRPLGS is realized as a technique that can be successfully implemented. RRPLGS depends on Rayleigh and Raman scattering in the atmosphere from $N_2$ and $O_2$ molecules and therefore is scalable in the magnitude of the backscattered light. In other words, there is no limit on the laser power. Like conventional Rayleigh scattering LGS, the laser used needs to be pulsed to permit range gating but otherwise does not need to be specialized, i.e., does not need to be tuned to a specific wavelength and polarization corresponding to a specific energy transition. For any single laser, there are various Raman backscattering mechanisms that can potentially be leveraged to yield multiple tilt measurements at the wavelength of observation. These multiple tilt measurements from a single laser can be combined for an improved tilt measurement, as further described below.

Furthermore, multiple different wavelength lasers can be used to yield multiple tilt measurements because Rayleigh and Raman scattering do not require a specific excitation wavelength. Because the returned photon flux from both Rayleigh and Raman scattering is inversely proportional to the laser wavelength to the fourth power, there is a preferred range of laser wavelengths for certain implementations. This continuous wavelength range has a lower bound due to the absorption of ozone in the near ultraviolet (UV) and an upper bound due to the magnitude of returned flux from Raman scattering.

Another advantageous feature of the disclosed embodiments is that laser beams having specific wavelengths in, for example, the UV region can be used to implement the LGSs, which cannot be fully implemented using sodium resonance LGS systems. As evident from FIG. 2, the slope of the refractive index of air in the UV region becomes very steep. In the disclosed embodiments, the two or more laser wavelengths in the UV region can produce a relatively large change in the refractive index ($\Delta n$), which enables a more accurate determination of the wavefront error, as evident from Equation (1), illustrating an inverse relationship between $\Delta n$ and $\theta$. Furthermore, the strength of the scattered return signal increases strongly as the laser wavelength is reduced. In some embodiments of the disclosed technology, therefore, scattered light associated with two or more wavelengths in the UV region can be used to effectuate an LGS system that experiences a large change in the index of refraction for the closely spaced wavelengths while simultaneously delivering a bright guide star in each wavelength.

For example, an RRPLGS implemented with three lasers, respectively at 349 nm, 355 nm, and 361 nm, using one Raman process, can result in a combined two-axis tilt measurement uncertainty that is 1.2 times the diffraction limit. In other implementations, lasers operating outside of the UV region can be used.

While there are many advantages to RRPLGS, there are a number of obstacles that seem to have been the reasoning for the scientific community to focus efforts on PSLGS. Just as with conventional Rayleigh scattering LGS, the RRPLGS can be limited to an altitude of no more than about 30 km. Nevertheless, most turbulence is below 20 km—namely, at ground level and at 10 km. Raman scattering cross sections of $N_2$ and $O_2$ are considerably small, resulting in low return flux relative to the Rayleigh line. Further, Raman scattering is usually limited in the spectral separation of any two wavelengths used in the returned spectra (from a single laser) to yield a differential tip-tilt measurement, which is related to limitation in $\Delta n$. Equation (1) above implies that a large $\Delta n$ is desired for an accurate tilt measurement.

Figure 3:
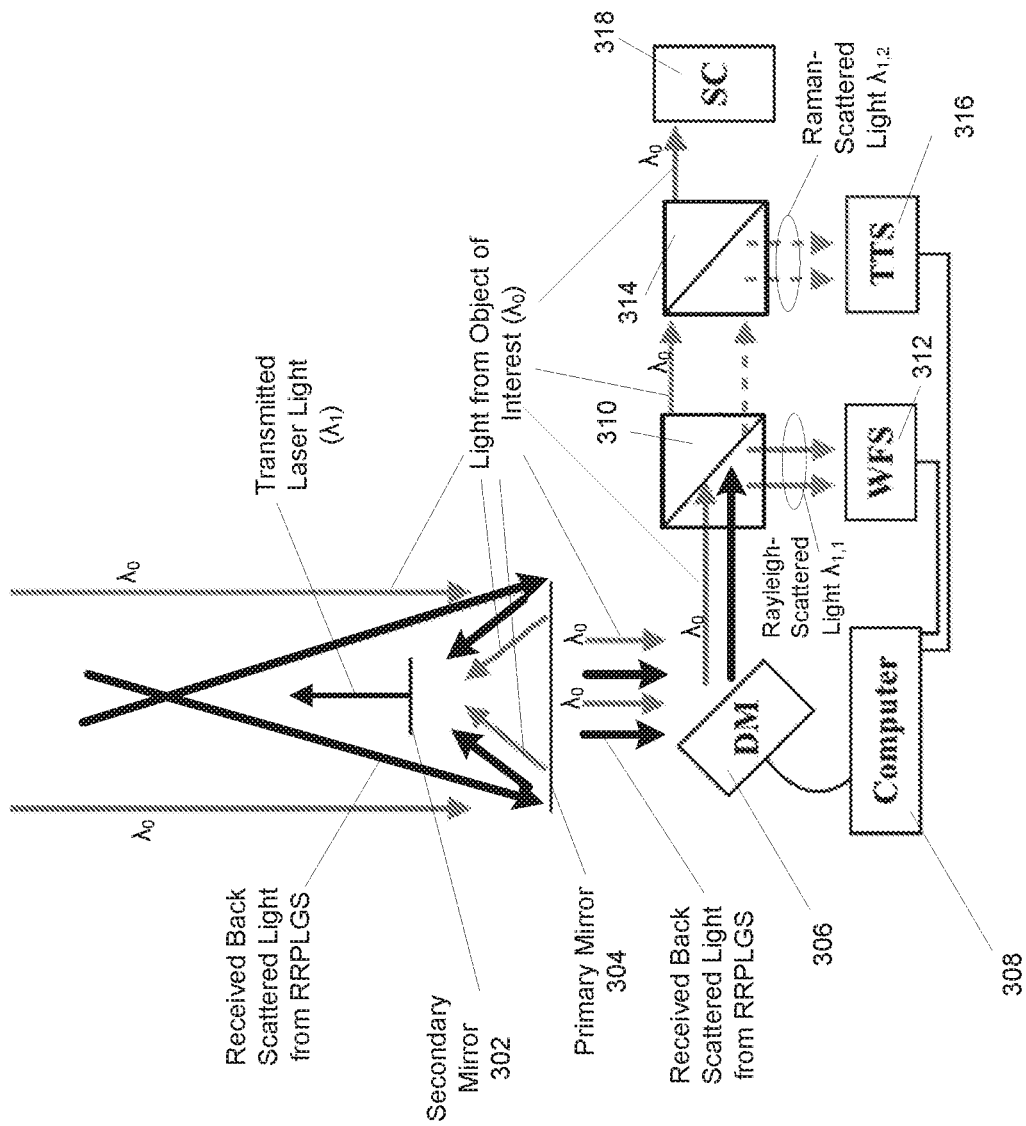
FIG. 3 illustrates a schematic of a Rayleigh-Raman polychromatic laser guide star (RRPLGS) system in accordance with an example embodiment.

FIG. 3 illustrates a basic schematic of an RRPLGS system in accordance with an example embodiment. The beacon is produced by projecting a laser beam at a single wavelength (e.g., $\lambda_1$) from the telescope (e.g., from behind the secondary mirror 302). The light from the object of interest (the science object) has a science wavelength, $\lambda_0$. The light from the finite conjugate beacon is returned in a diverging beam and collected by the primary mirror 304. The received light is directed to a series of beam splitters—only two 310, 314 are shown—that respectively separate the desired wavelengths (e.g., $\lambda_{1,1}$, $\lambda_{1,2}$, etc.). The first beam splitter 310 separates the Rayleigh-scattered light ($\lambda_{1,1}=\lambda_1$), while the second beam splitter 314 redirects the Raman-scattered light ($\lambda_{1,2}\neq\lambda_1$). In the example shown in FIG. 3, the wavefront is corrected by an AO system that includes deformable mirrors (DMs)—shown as box DM 306. The light after reflections from the DMs enters various beam splitters 310, 314 to reach the wavefront sensor (WFS) 312 and the tip-tilt sensor (TTS) 316. A science camera (SC) 318 receives the light associated with the object of interest. The WFS and/or TTS are coupled to a control system or a computer 308, which as illustrated in FIG. 1, includes, for example, a microprocessor and memory that includes processor executable code, to receive the sensed signals from the WFS 312 and TTS 314 devices, and to determine the wavefront error in accordance with the disclosed techniques. The control system is coupled to, or includes, the necessary piezo-electric or other types of movable components that effectuate deformations in the configuration of the mirrors or other deformable optical components to implement the wavefront corrections.

Figure 4:
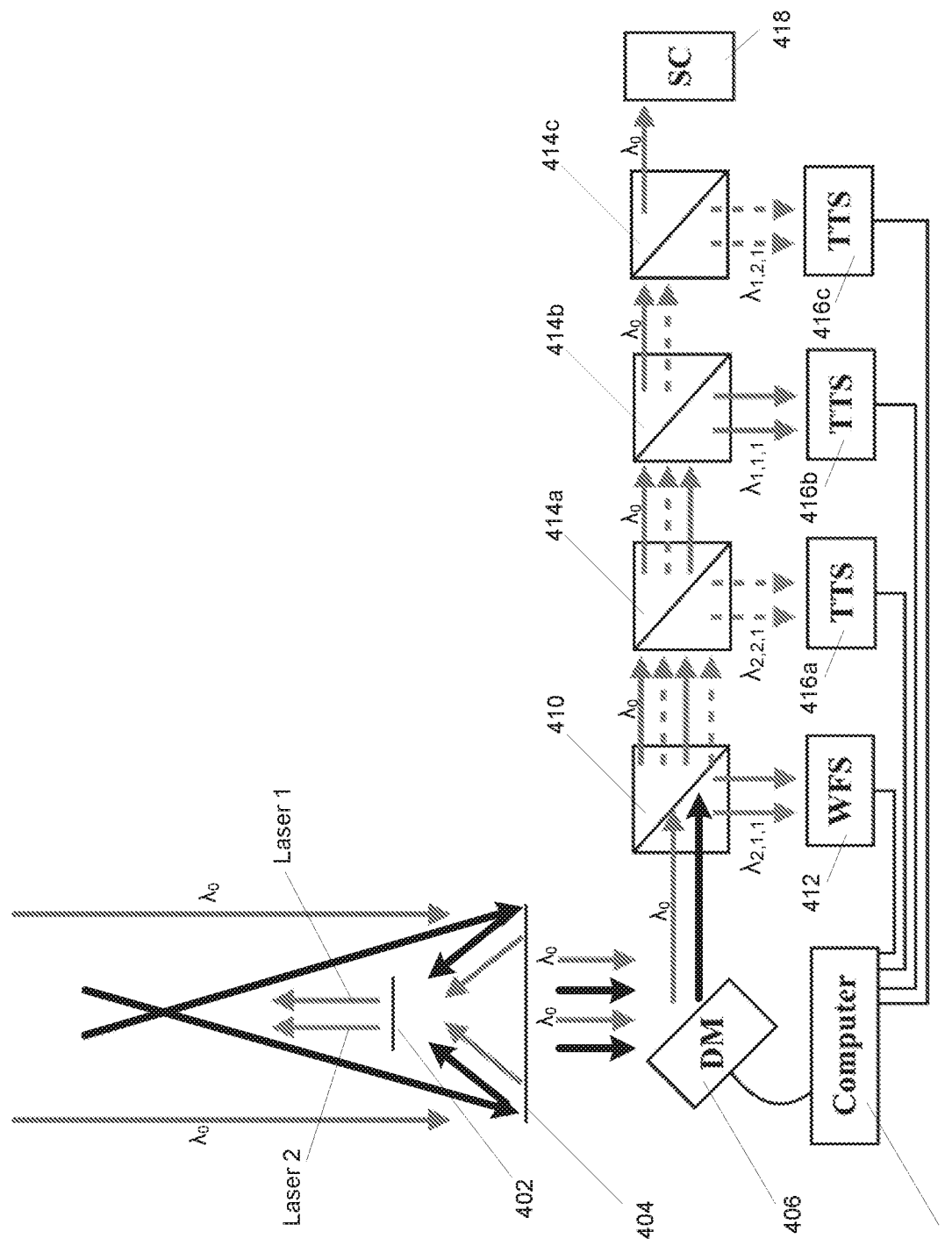
FIG. 4 illustrates an example RRPLGS system in accordance with an embodiment that includes two lasers.

While FIG. 3 illustrates only a single laser beacon and two beam splitters that are configured to separate the Rayleigh-scattered light and one Raman-scattered light, it is understood that additional beam splitters can be used to obtain additional Raman-scattered wavelengths. Further, in systems that use more than one laser beacon (e.g., polychromatic source lasers), additional beam splitters can be used to obtain the Rayleigh- and Raman-scattered light associated with the multiple lasers. FIG. 4 illustrates an example RRPLGS system in accordance with an embodiment that includes two laser beams and four beam splitters, where the Rayleigh-scattered light and one of the Raman-scattered components for each laser beam are sensed. In particular, two laser sources (Laser 1 and Laser 2) are launched from the vicinity of the secondary mirror 402. It is assumed that only two of the returned wavelengths are used per laser, one of which is the Rayleigh line. In this case the two Rayleigh wavelengths are represented by the solid ($\lambda_{1,1,1}$) and ($\lambda_{2,1,1}$) lines, corresponding to the first laser and the second laser, respectively. The counterpart dashed ($\lambda_{1,2,1}$) and ($\lambda_{2,2,1}$) lines represent Raman wavelengths associated with the first and the second lasers, respectively. The received light, including light having the science wavelength, $\lambda_0$, as well as the Raman and Rayleigh scattered light, is received by the primary mirror 404 and after reflection from the secondary mirror 402, is directed to the deformable optics 406 (e.g., a set of deformable mirrors), and then toward the beam splitters 410, and 414a to 414c. It should be noted that in some embodiments, other means for separating the components of the back-scattered light, such as narrowband filters, e.g., formed in a flywheel or other configuration, can be used. The light with the science wavelength (shown as top solid line passing at the top of the beam splitters) propagates through the beam splitters 410, 414a to 414c, and reaches the science camera 418. The light that arrives at the WFS 412 and TTS 416a to 416c is used to determine tip and tilt correction, which is fed back to the deformable optics 406 under the control of the computer 408.

It should be noted that in some embodiments, a fast-steering mirror can be used to effectuate tip-tilt correction. In some embodiments, a combination of one or more deformable mirrors and one or more fast steering mirrors can be used to effectuate the correction(s).

For combinations of tilt measurements made with a single laser, the notation used herein is such that $\lambda_o$ is the wavelength of observation, i is the $i^{th}$ measurement of the tilt at $\lambda_o$ from a single laser, and w indicates the first or second wavelength corresponding to this $i^{th}$ measurement and can only equal 1 or 2 for the example relationships that are described below. This tilt measurement is associated with the laser number, L, which is always a positive integer and is the $L^{th}$ measurement of the tilt at $\lambda_o$ related to the use of multiple lasers. For each $i^{th}$ measurement, there is a pair of wavelengths used that must be clearly identified. Thus, the wavelengths in this pair are denoted by $\lambda_{L,w,i}$. This notation is important for combinations of tilt measurements made with multiple lasers. Note that $\lambda_{L,w,i}$ corresponds to light that is traveling towards the imaging system.

From Equation (1) above, it can be stated that $$\sigma_{est,L,i}^2 = \sigma_{diff,L,i}^2 \left( \frac{n(\lambda_o) - 1}{n(\lambda_{L,1,i}) - n(\lambda_{L,2,i})} \right), \quad (2)$$

where for the $L^{th}$ laser, $\sigma_{est,L,i}^2$ is the variance in the $i^{th}$ measurement of the tilt at the wavelength of observation. In other words, $\sigma_{est,L,i}$ is the tilt measurement uncertainty in units of radians of wavefront angle. $\sigma_{diff,L,i}^2$ is the variance in the $i^{th}$ measurement of the differential tilt. The measured differential tilt is simply the difference between the measured tilt at $\lambda_{L,1,i}$ and the measured tilt at $\lambda_{L,2,i}$.

Assuming the two tilt measurements that are differenced are independent relative to each other, it follows that $$\sigma_{diff,L,i}^2 = \sigma_{L,1,i}^2 + \sigma_{L,2,i}^2, \quad (3)$$

where $\sigma_{L,w,i}^2$ is the uncertainty in the measurement of the tilt using $\lambda_{L,w,i}$. Note that $\sigma_{L,w,i}$ takes into account both the temporal and spatial uncertainty. $\sigma_{L,w,i}$ is related to $\sigma_\alpha(\lambda_{L,w,i})$, the angular position measurement uncertainty for a plane tilted wavefront, by an average of the tilts measured over a number of subapertures (Zernike tip-tilt is the least-mean-square slope of the wavefront). Thus $$\sigma_{L,1,i} = \frac{\sigma_\alpha(\lambda_{L,w,i})}{\sqrt{g_{L,w,i}}}, \quad (4)$$

in which $g_{L,w,i}$, the number of subapertures in the entrance pupil, is approximated by an object-space area ratio $$g_{L,w,i} = \frac{D_r^2}{d_{L,w,i}^2}, \quad (5)$$

where $D_r$ is the diameter of the entrance pupil of the receiving telescope and $d_{L,w,i}$ is the subaperture size. Note that different wavelengths (designated by L, w, and i) can be directed to different wavefront sensors. In the case of a tip-tilt sensor, a single lens (as opposed to a lenslet array) can be used to sense the overall wavefront tip and tilt across the entire pupil, i.e., sense the global tip and tilt. This can be thought of as a Shack-Hartmann wavefront sensor (SHWFS) with one "subaperture." In such a case, $d_{L,w,i}$ is the size of a single lens that has the same object space size as the entrance pupil diameter, making $g_{L,w,i}$ equal unity.

$\sigma_\alpha(\lambda_{L,w,i})$ for a SHWFS in this context corresponds to the tip-tilt measurement uncertainty corresponding to the wavelength $\lambda_{L,w,i}$, and is given by:

$$\sigma_\alpha(\lambda_{L,w,i}) = \frac{\sqrt{2}\pi}{8 SNR_{L,w,i}} \left[ \left( \frac{3\lambda_{L,w,i}}{2r_o(\lambda_{L,w,i})} \right)^2 + \Delta\alpha \right]^{1/2} \quad r_o(\lambda_{L,w,i}) < d_{L,w,i}. \quad (6)$$

In the equation above, $\Delta\alpha$ is the object space subtense of the beacon in radians of angle. $\Delta\alpha$ is described in more detail below, $r_o(\lambda_{L,w,i})$ is the Fried length and is a function of wavelength. $SNR_{L,W,i}$ is represented by Equation (7) and is the signal to noise ratio corresponding to the $w^{th}$ wavelength related to the $i^{th}$ measurement for the $L^{th}$ laser. Assuming random perturbations, the tilt in two orthogonal directions is taken into account by multiplying by $\sqrt{2}$, as shown in Equation (6). If the size of the subaperture in object space is more limiting than the Fried length. i.e., if $d_{L,w,i}$ is less than $r_o(\lambda_{L,w,i})$, then $r_o(\lambda_{L,w,i})$ in Equation (6) is replaced by $d_{L,w,i}$. To convert the units of $\sigma_\alpha(\lambda_{L,w,i})$ from radians of wavefront angle to radians of phase error, Equation (6) is multiplied by $2\pi d/\lambda_{L,w,i}$.

The signal to noise ratio (corresponding to the wavelength $\Delta_{L,w,i}$) for a unity gain quad-cell detector with negligible detected background electrons per pixel is given by:

$$SNR_{L,W,i} = \frac{n_p(\lambda_{L,w,i})}{\left(n_p(\lambda_{L,w,i}) + p_s e^2\right)^{1/2}}, \quad (7)$$

where $p_s$ is the number of pixels per subaperture, e is the read noise per pixel in units of electrons rms, and $n_p$ is the expected number of photons per measurement per subaperture. The equation for $n_p$ is:

$$n_p(\lambda_{L,w,i}) = M_{L,w,i} \left[ \frac{\lambda_{L,w,i}}{hc} \frac{\sigma_{B,L,w,i} N(z)_{L,W,i} \Delta z}{4\pi} \frac{T_{A,L,w,i} T_{A,A}}{z^2} \right] E_{L,w,i} T_L T_o A_{L,w,i}. \quad (8)$$

The transmission factors are given by $T_{A,L,w,i}$, $T_{A,A}$, $T_L$, and $T_o$, and are the one-way transmission of atmosphere between the telescope and the beacon corresponding to the wavelength $\lambda_{L,w,i}$, the one-way transmission of atmosphere between the telescope and the beacon corresponding to the laser light traveling away from the imaging system (not necessarily equal to $\lambda_{L,w,i}$), the transmission of the laser path to the projection aperture, and the transmission of optical components in the transmit and receive paths, respectively. Notice that if the wavelength is the same in transmission and reception then $T_{A,A}=T_{A,L,w,i}$. $M_{L,w,i}$ is the number of laser pulses received within the integration time corresponding to a tip-tilt or higher-order measurement; note that $M_{L,w,i}$ is further specified as per tip-tilt measurement ($M_{TT,L,w,i}$) or per higher-order measurement ($M_{HO,L,w,i}$). The distance from the telescope to the center of the range gate is z, in meters. The effective backscatter cross section in m² corresponding to the wavelength $\lambda_{L,w,i}$ is given by $\sigma_{B,L,w,i}$. The atmospheric density of the scattering molecules as a function of z, the range to the center of the range gate, is given by $N(z)_{L,w,i}$ in units of m⁻³. $E_{L,w,i}$ is the laser energy per pulse in Joules corresponding to the wavelength $\lambda_{L,w,i}$. The area of the receiving aperture (or subaperture) is $A_{L,w,i}$, h is the Planck constant, and c is the velocity of light. $\Delta z$ is the chosen receiver range gate length in units of meters. The maximum allowable receiver range gate length can be shown to be $\Delta z_{max}(\lambda_{L,w,i})$ which corresponds to the diameter of the laser guide star matched to the natural stellar width, $\Delta\alpha_{star}(\lambda_{L,w,i})$. This maximum allowable receiver range gate length is found geometrically to be $$\Delta z_{max}(\lambda_{L,w,i}) = \frac{2D_e \Delta\alpha_{star}(\lambda_{L,w,i})z^2}{D_e^2 - (z\Delta\alpha_{star}(\lambda_{L,w,i}))^2}, \quad (9)$$

where $$\Delta\alpha_{star} = \frac{\lambda_{L,w,i}}{r_o(\lambda_{L,w,i})} \quad r_o(\lambda_{L,w,i}) < d_{L,w,i}. \quad (10)$$

Note that $D_e$, the diameter of the laser emission telescope aperture, does not have to be the full aperture of the telescope. In fact, $D_e$ can be chosen to be as small as possible, but large enough for a reasonably stable LGS centroid. Typically, a value of approximately $3r_o(\lambda_{L,w,i})$ is chosen for $D_e$. Rearranging Equation (9), an expression relating an arbitrary range gate length $\Delta z$ and the corresponding angular size of the beacon, $\Delta\alpha$, is $$\Delta\alpha = \frac{D_e}{z\Delta z}\left(-z + \sqrt{z^2 + \Delta z^2}\right). \quad (11)$$

$\Delta z$ will ultimately be chosen to minimize the total wavefront error budget, but for the purposes of this preliminary analysis it can be chosen based on spot elongation. The elongation angle describing angular extent of the range gate, i.e., elongated beacon, as seen from a transverse distance of r from the center of the entrance pupil is given via simple geometry and small angle approximation by:

$$\theta_{elong} = \frac{r\Delta z}{z^2 - \left(\frac{\Delta z}{2}\right)^2}. \quad (12)$$

Letting the approximate LGS FWHM be the average wavelength divided by the corresponding Fried length, the total angular extent of the spot in the radial direction is approximated by adding in quadrature. Defining $\theta_{total}$ as the seeing limit multiplied by a fraction Q, $$\theta_{total} = \sqrt{\left(\frac{\lambda_{avg}}{r_o(\lambda_{avg})}\right)^2 + \theta_{elong}^2} = Q\frac{\lambda_{avg}}{r_o(\lambda_{avg})}. \quad (13)$$

Notice that Q must be greater than 1. Approximating $\Delta z$ as small such that the denominator in Equation (12) is simplified, the approximate $\Delta z$ corresponding to a value for Q is:

$$\Delta z = \frac{\lambda_{avg} z^2}{r_o(\lambda_{avg})r}\sqrt{Q^2 - 1}. \quad (14)$$

As for the choice of $M_{L,w,i}$, the system is limited by $\tau_{c,L,w,i}$, the atmospheric coherence time (for wavelength $\lambda_{L,w,t}$). However, $\tau_{c,L,w,t}$ is a summary statistic that describes the change in the entire wavefront, not a particular mode (e.g., tilt), so it is very conservative for changes in tilt, for tilt is more slowly varying. Based on investigation of the fundamental tracking frequency for the Zernike tip and tilt, this correction frequency is approximately one ninth of the Greenwood frequency, i.e., $$f_{Z,L,w,i} = \frac{1}{9}f_{G,L,w,i} = \frac{1}{9}\frac{0.134}{\tau_{c,L,w,i}} = \frac{1}{9}\frac{0.134v}{0.314r_o(\lambda_{L,w,i})}. \quad (15)$$

v is the wind velocity at the altitude of correction. The number of laser pulses per tip-tilt measurement is then given by the laser pulse repetition rate, $f_{p,L}$, divided by $f_{Z,L,w,i}$, $$M_{TT,L,w,i} = \frac{f_{p,L}}{f_{Z,L,w,i}}. \quad (16)$$

Likewise, the number of laser pulses per higher-order measurement is given by:

$$M_{HO,L,w,i} = \frac{f_{p,L}}{f_{G,L,w,i}}. \quad (17)$$

Equations (2)-(8) and (11) are used to form an expression for $\sigma_{est,L,i}^2$. In the shot noise limit, i.e., when $SNR_{L,w,i}$ is simplified to be $\sqrt{n_p(\lambda_{L,w,i})}$, this expression is $$\sigma_{ext,L,i}^2 = \left(\frac{\sqrt{2\pi}}{8}\right)^2 (Y_{L,1,i} + Y_{L,2,i})\left(\frac{n(\lambda_o) - 1}{n(\lambda_{L,1,i}) - n(\lambda_{L,2,i})}\right)^2, \quad (18)$$

where $$Y_{L,w,i} = \frac{4\pi hcz^2\left[\left(\frac{3\lambda_{L,w,i}}{2r_o(\lambda_{L,w,i})}\right)^2 + \left(\frac{D_e}{z\Delta z}\left(-z + \sqrt{z^2 + \Delta z^2}\right)\right)^2\right]}{g_{L,w,i}M_{L,w,i}\lambda_{L,w,i}\sigma_{B,L,w,i}N(z)_{L,w,i}\Delta z T_{A,L,w,i}T_{A,A}E_{L,w,i}T_L T_o A_{L,w,i}}. \quad (19)$$

The optimal combination of the various tip-tilt measurements at the wavelength of observation is of particular interest. This can yield a reduced variance in the final measurement. It is required that each different wavelength laser results in two or more wavelengths returning towards the imaging system. One way to improve the accuracy of the tip-tilt measurement at the wavelength of observation is to combine the measurements arising from all pairs of wavelengths in the spectrum of the returned light. This makes the most out of each laser. Additionally, with many different wavelength lasers, the tip-tilt measurement at the wavelength of observation from each different wavelength laser can be combined. In other words, the possible combinations are twofold: there are combinations related to the use of one laser, and there are combinations related to the use of multiple lasers. Note that in determining any single tip-tilt estimate at the wavelength of observation, the pair of wavelengths used must come from the result of one laser. This is because the wavelength pairs used for a differential tilt measurement must be known to have come from the same point in space. The returned light from a laser of one wavelength and the returned light from a laser of another wavelength are not known to have come from the same point in space because the deflection of the reference light traveling towards the object of observation is unknown.

The combinations related to the use of multiple lasers are considered first. Once a tip-tilt measurement at the wavelength of observation is found from a single laser, whether it be from a single pair of wavelengths or a combination of pairs of wavelengths from the returned light spectrum, this result, in some embodiments, can be combined with that of additional lasers of different wavelength via a weighted average. For example, each measurement is optimally weighted by the reciprocal square of the associated uncertainty via maximum likelihood. The tip-tilt measurement at the wavelength of observation for each different wavelength laser is identified by laser number L (the maximum value of L is $L_{max}$, the number of different wavelength lasers used), and has an uncertainty of $\sigma_{best,Las,L}$. The best estimate for the mean of the true tilt is given by:

$$\theta_{best,final} = \frac{\sum_{L=1}^{L_{max}} \frac{\theta_{best,Las,L}}{\sigma^2_{best,Las,L}}}{\sum_{L=1}^{L_{max}} \frac{1}{\sigma^2_{best,Las,L}}}. \tag{20}$$

$\theta_{best,Las,L}$ is defined in Equation (22). Assuming that the tip-tilt measurements of the wavelength of observation from different lasers are uncorrelated, of $\sigma_{best,final}$, the uncertainty in the weighted average of the tilt measurements from different lasers, can be calculated via error propagation:

$$\sigma_{best,final} = \left( \sum_{L=1}^{L_{max}} \frac{1}{\sigma^2_{best,Las,L}} \right)^{-1/2}. \tag{21}$$

Note that if only one measurement of the tilt at the wavelength of observation is found per laser (i.e., the maximum value of i is unity), then $\sigma_{best,Las,L}^2$ simply equals $\sigma_{est,L,1}^2$. As for the combinations related to the use of one laser, one cannot safely assume that the tip-tilt measurements at the wavelength of observation are uncorrelated. The following relates $\sigma_{est,L,1}^2$ to $\sigma_{best,Las,L}^2$ for multiple single-laser measurements of the tilt (the maximum value of i is greater than 1) at the wavelength of observation.

In the context of combinations related to the use of one laser (L is fixed), let $\theta_{est,L,i}$ be the $i^{th}$ measurement of the tilt at the wavelength of observation (using the $L^{th}$ laser) with measurement uncertainty $\sigma_{est,L,i}$. $\vec{\theta}_{est}$ is a real and random vector of various $\theta_{est,L,i}$ and has dimensions q×1. Let q be the number of pairs of returned wavelengths from a single laser (the maximum value of i is q). Assuming that $\vec{\theta}_{est}$ is normally distributed, i.e., the probability density function of $\vec{\theta}_{est}$ given the mean θ is a q-dimensional normal of mean θ and covariance matrix $K_\theta$, the method of maximum likelihood yields that when using only one laser, the best estimate of the mean of the true tilt is given by:

$$\theta_{best,Las,L} = \frac{\vec{\theta}_{est}^T K_\theta^{-1} \vec{\xi}}{\vec{\xi}^T K_\theta^{-1} \vec{\xi}}, \tag{22}$$

where $\vec{\xi}$ is a q×1 column vector of ones. It is easy to show that given the general form $\vec{y} = B\vec{x}$, the covariance matrix of $\vec{y}$, $K_y$, is related to that of $\vec{x}$ by: $K_y = B K_x B^T$. Likewise, $\vec{y} = \beta B \vec{x}$, yields $K_y = \beta^2 B K_x B^T$, where β is a scalar. This can further be extended by stating a general form $y = \beta \vec{\xi}^T B \vec{x}$, which yields that the variance of y is $\sigma_y^2 = \beta^2 \vec{\xi}^T B K_x B T \vec{\xi}$. Applying this general form to Equation (22) and noting that covariance matrices are Hermitian, i.e., $\vec{\theta}_{est}^T K_\theta^{-1} \vec{\xi} = \vec{\xi}^T K_\theta^{-1} \vec{\theta}_{est}$ for this real case, yields that when using only one laser the uncertainty of the best estimate of the mean of the true tilt is given by $$\sigma_{best,Las,L} = (\vec{\xi}^T K_\theta^{-1} \vec{\xi})^{-1/2}. \tag{23}$$

Note that if the elements of $\vec{\theta}_{est}$ are not correlated. Equation (23) matches the form of Equation (21) and Equation (22) is reduced to an optimally weighted average akin to Equation (20).

Combinations related to the use of multiple lasers can be realized by considering one Raman process, but the combinations related to the use of one laser are made possible by taking into account multiple Raman scattering processes. Rayleigh scattering (elastic) off air molecules provides the largest signal, which can be used for high-order wavefront sensing. Raman scattering (inelastic) results in weaker signals that are Raman shifted to wavelengths that differ from the laser wavelength. At altitudes less than 100 km, the composition of air is approximately 76% $N_2$ and 21% $O_2$.

The Raman scattering processes of interest include vibrational (Stokes and Anti-Stokes), rotational, stimulated, and cascaded. Vibrational Q-branch transitions result in a shift in wavelength characterized by the Raman shift (2331 cm$^{-1}$ for $N_2$ and 1555 cm$^{-1}$ for $O_2$), and the cross section as a function of wavelength can be determined. A Raman shift that results in a longer wavelength (Stokes) is more common and thus has more flux than a Raman shift that results in a shorter wavelength (Anti-Stokes). The spectra associated with rotational Raman scattering are observed surrounding the Rayleigh line and the vibrational Raman lines. Rotational Raman shifts range from approximately 5 cm$^{-1}$ to 200 cm$^{-1}$ from the central line and have lower flux than vibrational Raman scattering. The rotational Raman cross section as a function of wavelength for $N_2$ and $O_2$ can be determined by known techniques. Stimulated Raman scattering uses two (in this case, co-linear in space) lasers with the same polarization that have a difference in wavelength equal to a wavelength corresponding to a Raman transition (with a characteristic Raman shift) of the molecule. It is the difference in wavelength between the two lasers that matters in this case. Stimulated Raman scattering results in Raman scattered light that is several orders of magnitude brighter than typical (spontaneous) Raman scattering. Cascaded Raman scattering occurs with high laser pulse energy and results in multiple orders of Raman scattering, i.e., a larger separation of wavelength from the Rayleigh line. This is of particular interest in RRPLGS because a high laser power is possible with RRPLGS and a large Δn is beneficial (see Equations (1) and (2)).

Using the equations above, a specific system model was simulated with the parameters in Table 1. For this example simulation, only Rayleigh scattering and Stokes vibrational Q-branch Raman scattering from $N_2$ were taken into account. In other words, only one measurement of the tilt at $\lambda_o$ is found per laser, and combinations related to the use of one laser are not included. Note that data from known sources, such as Chapter 7 of the *Handbook of Geophysics and Space Environments*, were used for atmospheric transmission as a function of wavelength ($T_{A,A}$ and $T_{A,L,w,i}$) with observation angle at zenith. Pressure and temperature values used for Rayleigh cross section and atmospheric density of $N_2$ as a function of altitude were also obtained from known sources.

Figure 5:
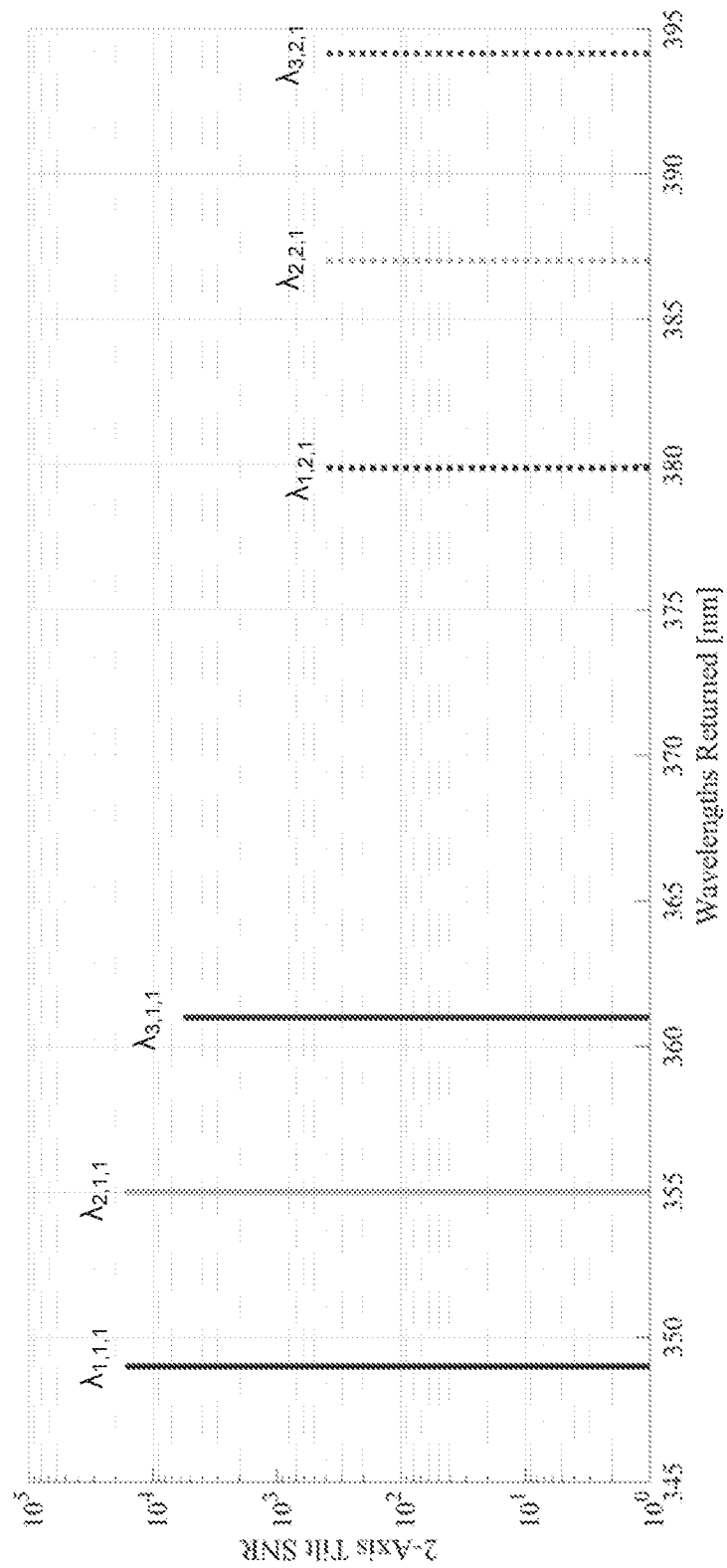
FIG. 5 illustrates an example plot of two-axis tilt signal to noise ratio (SNR) against the returned wavelength spectrum.

To compare the SNR between various spectral lines, the SNR taking into account the entire collecting area (called the tilt SNR) is plotted against the returned wavelength spectrum in FIG. 5. The Rayleigh wavelengths are represented by the solid lines while the counterpart dashed lines correspond Raman lines. Using the previously described notation for subscripts, L, w, and i, the lines having the same first index (e.g., $\lambda_{1,2,1}$ and $\lambda_{1,1,1}$) represent a pair of wavelengths used to measure the tilt at the wavelength of observation. In the shot noise limit, the SNR taking into account the entire collecting area is given by $SNR_{L,w,i}$ multiplied by $\sqrt{g_{L,w,i}}$, since $n_p$ is multiplied by $g_{L,w,i}$ to take into account the entire collecting area. Notice that the 361 nm returned wavelength is sent to the SHWFS for higher-order mode correction, and because $M_{HO,L,w,i} < M_{TT,L,w,i}$ the SNR is lower.

TABLE 1

Key input parameters of specific system model simulation.

| System Parameter | Symbol | Units | Value |
|---|---|---|---|
| Wavelength of Observation | $\lambda_o$ | nm | 1500 |
| Object Space Tip-Tilt Aperture Size and Telescope Diameter | $D_r$ | m | 3 |
| Rayleigh Wavelength Corresponding to Laser 1 (Nd:YLF) | $\lambda_{1,1,1}$ | nm | 349 |
| Rayleigh Wavelength Corresponding to Laser 2 (Nd:YAG) | $\lambda_{2,1,1}$ | nm | 355 |
| Rayleigh Wavelength Corresponding to Laser 3 (Nd:YAlO) | $\lambda_{3,1,1}$ | nm | 361 |
| Laser Energy Per Pulse (For All Lasers) | E | mJ | 40 |
| Laser Pulse Repetition Rate | $f_p$ | kHz | 5 |
| Number of Pulses Captured Per Tip-Tilt Measurement | $M_{TT,L,w,i}$ | pulses | 300 |
| Number of Pulses Captured Per Higher-Order Measurement | $M_{HO,L,w,i}$ | pulses | 33 |
| Range to Center of Range Gate | z | km | 12 |
| Range Gate Length | Δz | km | 0.6 |
| Laser Emission Telescope Diameter | $D_e$ | cm | 30 |
| Fried Length at 500 nm | $r_o$ (500 nm) | cm | 15 |

As expected, due to the small Raman cross section, the SNR of Raman lines is relatively low compared to the Rayleigh. The high laser power results in high SNR values.

To compare the effectiveness of each laser in reducing the uncertainty in the weighted average (see Equation (21)), $\sigma_{best,Las,L}$ for L=1, 2, and 3 are compared in Table 2, which lists the uncertainty (in units of arcseconds of wavefront angle) as function of laser wavelength. The resulting uncertainty in the weighted average is 0.12 arcsec of wavefront angle. The uncertainties are extremely similar. This is due to the impact of $g_{L,w,i}$ in Equation (4) and the refractive index term in Equation (2) increasing with longer laser wavelength due to the Raman shift (2331 cm$^{-1}$). Applying Equation (21), the resulting uncertainty in the weighted average, $\sigma_{best,final}$, is 0.12 arcsec of wavefront angle. For reference, the diffraction limit $\lambda_o/D_r$ is 0.10 arcsec of wavefront angle.

TABLE 2

Comparison of the tilt measurement uncertainty

| Laser Wavelength [nm] | Two-Axis Tilt Measurement Uncertainty [Arcsec] |
|---|---|
| 349 | 0.201 |
| 355 | 0.204 |
| 361 | 0.207 |

Figure 6A:
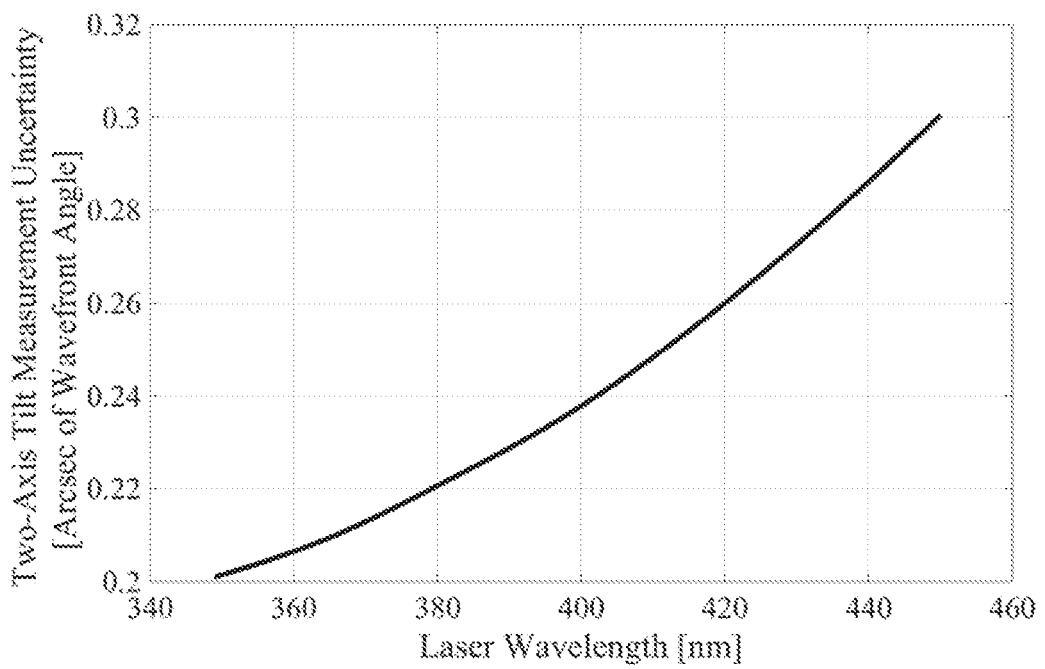
FIG. 6A illustrates an example plot of two-axis tilt measurement uncertainty as a function of laser wavelength for laser energy of 40 mJ.
Figure 6B:
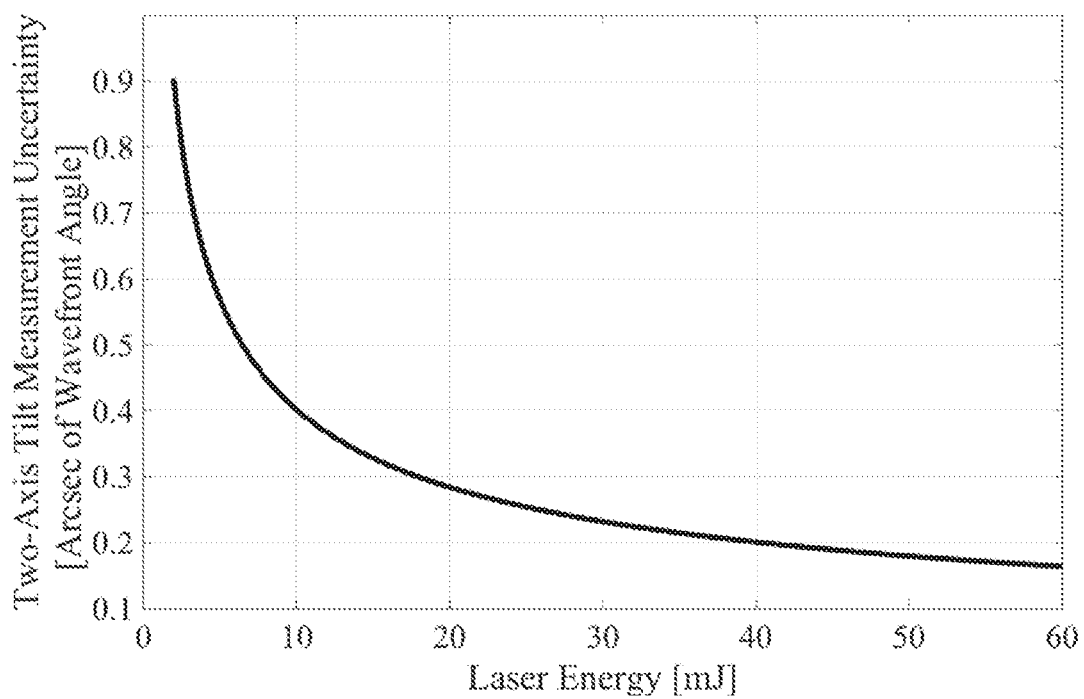
FIG. 6B illustrates an example plot of two-axis tilt measurement uncertainty as a function of laser energy using a 349 nm laser.

Keeping all system parameters the same but now using only one laser, the tilt measurement uncertainty corresponding to one laser can be analyzed as a function of wavelength and laser power, as shown in the example plots of 6A and 6B. Note that for this single laser case, high-order mode correction is included by directing the Rayleigh line to a SHWFS. In FIG. 6A, for E of 40 mJ, $\sigma_{best,Las,1} = \sigma_{best,final}$ as a function of $\lambda_{1,1,1}$ is plotted. In FIG. 6B, using only the 349 nm laser (i.e., $\lambda_{1,1,1}$=349 nm), $\sigma_{best,Las,1} = \sigma_{best,final}$ as a function of E is plotted. Note that $f_p$=5 kHz FIG. 6A shows that taking into account the transmission of atmosphere and Raman cross section both as functions of wavelength, a shorter wavelength (the minimum being 349 nm in the plot) results in less uncertainty in the tilt measurement. FIG. 6B shows that even though saturation is not an issue in RRPLGS, shot noise limits the effectiveness of increasing laser power. Clearly, strategies other than maximizing the laser power are necessary to demonstrate the full potential of RRPLGS.

The disclosed embodiments can be implemented as part of optical systems that image through random turbulent media, such as the atmosphere or water. Additional imaging applications are enabled due in-part to the ability to effectuate wavefront correction and characterization of the turbulent media without relying on photons from the object of interest to sense the image motion. As a result, images of very faint objects that currently cannot be obtained in a single adaptive optics camera snapshot can be produced. For example, one application includes day-time imaging of artificial satellites, which are fainter than the sky background, and are thus obscured by photon noise from the blue sky. A simulation using three lasers and only one Raman process has shown a combined two-axis tilt measurement uncertainty that is 1.2 times the diffraction limit. Furthermore, even if only a partial correction is achieved, there are suitable applications such as wide-field ground-layer adaptive optics systems that can benefit from the disclosed RRPLGS systems and methodologies. As laser technology improves, the RRPLGS technology becomes even more promising. For example, with the use of a high power next-generation supercontinuum laser many combinations of two-axis tilt measurements can be produced which result in improved measurements.

Figure 7:
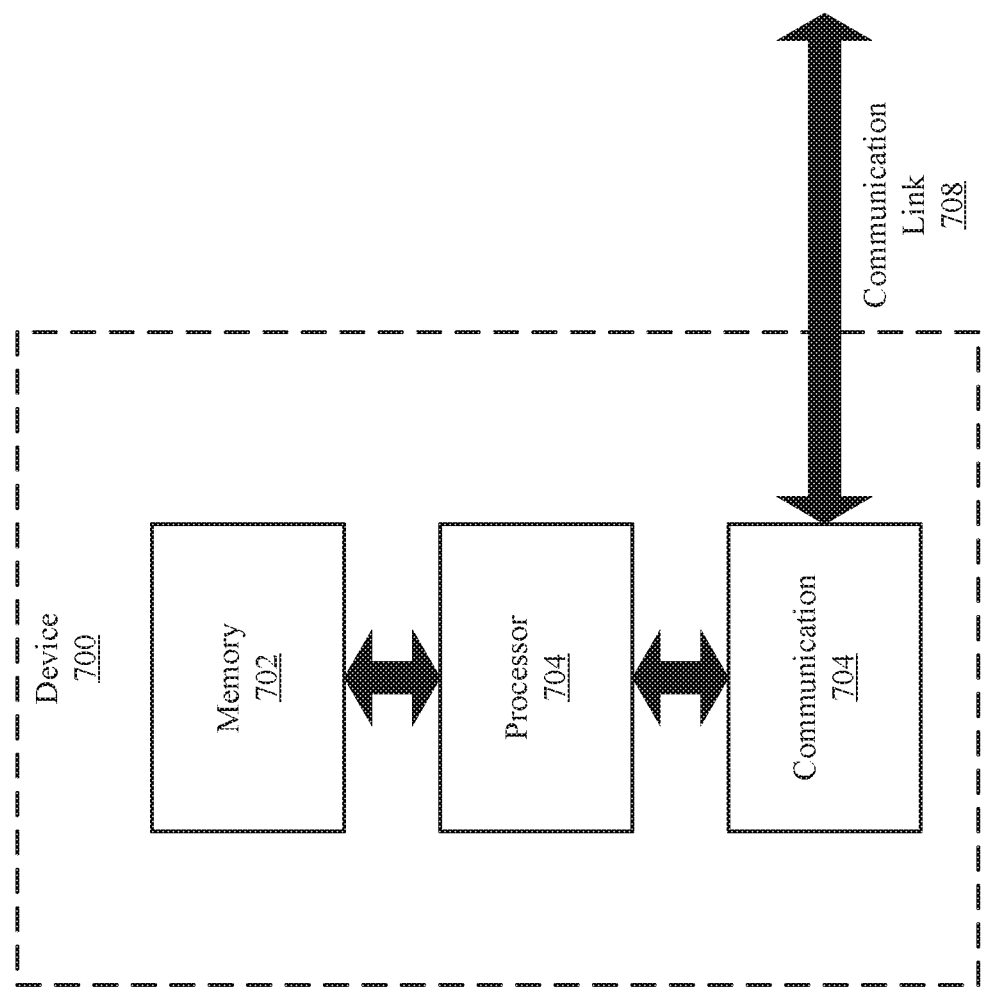
FIG. 7 illustrates a block diagram of a device which can be used to implement at least some of the operations associated with the disclosed embodiments.

FIG. 7 illustrates a block diagram of a device 700 which can be used to implement at least in-part some of the various disclosed embodiments. The device in FIG. 7 can, for example, be implemented as part of the control system, the wavefront sensor and/or the tip-tilt sensor of FIG. 1, 3 or 4. The device 700 comprises at least one processor 704 and/or controller, at least one memory 702 unit that is in communication with the processor 704, and at least one communication unit 706 that enables the exchange of data and information, directly or indirectly, through the communication link 708 with other entities, devices, databases and networks. The communication unit 706 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The example device 700 of FIG. 7 may be integrated as part of any devices or components shown in FIG. 1, 3 or 4 to carry out any of the disclosed methods.

Figure 8:
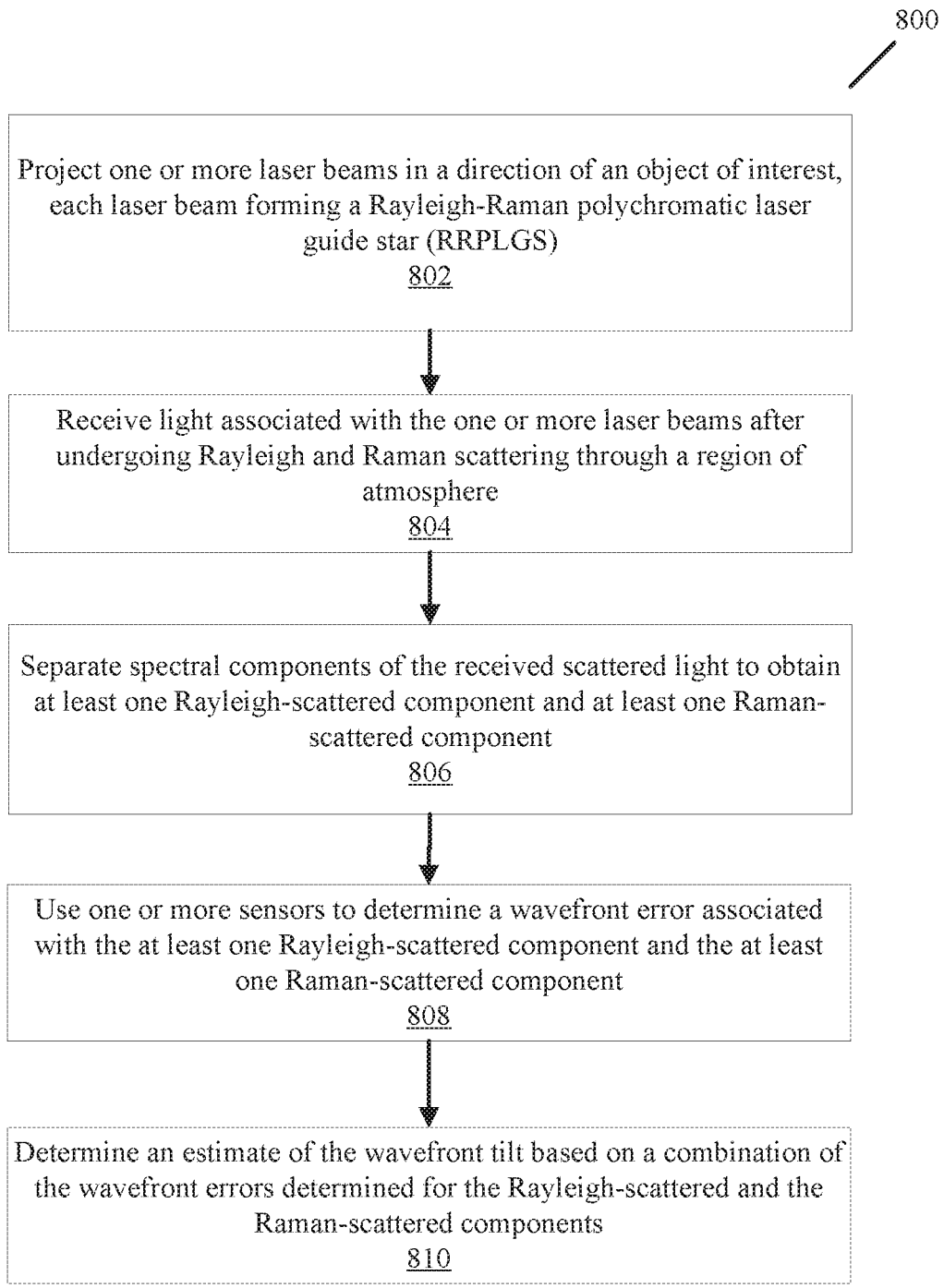
FIG. 8 illustrates a set of operations that can be carried out to determine wavefront tilt in a system that utilizes a laser guide star.

FIG. 8 illustrates a set of operations 800 that can be carried out to determine wavefront tilt in a system that utilizes a laser guide star. At 802 one or more laser beams are projected in a direction of an object of interest to form one or more Rayleigh-Raman polychromatic laser guide stars (RRPLGSs). At 804, light associated with the one or more laser beams after undergoing Rayleigh and Raman scattering through a region of atmosphere is received. At 806, spectral components associated with the received scattered light are separated to obtain at least one Rayleigh-scattered component and at least one Raman-scattered component. At 808, a wavefront error associated with each of the at least one Rayleigh-scattered and the least one Raman-scattered components is determined using a sensor. At 810, an estimate of the wavefront tilt is determined based on a combination of the wavefront errors determined for each of the Rayleigh-scattered and Raman-scattered components.

In one example embodiment, separating the spectral components results in obtaining at least two Raman-scattered components, and determining the estimate of the wavefront tilt includes using the wavefront errors determined for each of the Rayleigh-scattered component and the at least two Raman-scattered components. In another example embodiment, the above noted method includes projecting more than one laser beam in the direction of the object of interest, wherein each laser beam is associated with a corresponding Rayleigh scattering wavelength and one or more Raman scattering wavelengths, receiving light associated with each laser beam after undergoing Rayleigh and Raman scattering through the region of atmosphere, separating spectral components of the received scattered light to obtain a plurality of Rayleigh-scattered components and a plurality of Raman-scattered components, using the one or more sensors to determine wavefront errors associated with each of the Rayleigh-scattered and the Raman-scattered components, and determining the estimate of the wavefront tilt based on a combination of the wavefront errors determined for each of the Rayleigh-scattered and Raman-scattered components.

According to another example embodiment, the one or more sensors includes a Shack-Hartmann wavefront sensor, a tilt-tip wavefront sensor or a pyramid wavefront sensor. In yet another example embodiment, an output wavelength of the one or more laser beams is selected to be in the range spanning the ultraviolet to infrared region of electromagnetic radiation. In still another example embodiment, an output wavelength of the one or more laser beams is in an ultraviolet region of electromagnetic radiation. In one example embodiment, a variance of the estimated tilt error is determined according to Equation (2).

In one example embodiment, separating the spectral components includes directing the received scattered light to one or more beam splitters, where each beam splitter is configured to allow one component of the received scattered light to be deflected away from the remaining portions of the received scattered light. In another example embodiment, separating the spectral components includes using one or more narrow band filters, where each narrow band filter allows only one of the spectral components to pass therethrough. In still another example embodiment, the above noted method further includes providing the estimate of the wavefront tilt to an adaptive optics system to effectuate a wavefront correction and to allow formation of an improved image of the object of interest. In yet another example embodiment, the estimate of the wavefront tilt compensates for at least a portion of turbulence of the atmosphere.

In another example embodiment, the one or more laser beams include at least two laser beams that are produced using separate laser devices, where each operates at a distinct wavelength. In yet another example embodiment, the above method further includes using an additional laser device for augmenting a power of the one or more laser beams, wherein the additional laser device is configured to operate at the same wavelength of one of the one or more laser beams.

Another aspect of the disclosed embodiments relates to a system for determining wavefront tilt that includes one or more laser devices configured to project one or more laser beams in the direction of an object of interest and to form one or more Rayleigh-Raman polychromatic laser guide stars (RRPLGSs). The system further includes a telescope configured to receive light associated with the one or more laser beams after undergoing Rayleigh and Raman scattering through a region of atmosphere, one or more filters or beam splitters positioned to receive at least a portion of the received scattered light and to separate spectral components of the received scattered light to obtain at least one Rayleigh-scattered component and at least one Raman-scattered component, and one or more sensors positioned to receive the at least one Rayleigh-scattered component and the at least one Raman-scattered component, and to produce one or more signals indicative of a wavefront error associated with the at least one Rayleigh-scattered component and at least one Raman-scattered component. The system also includes a processor and a memory comprising processor executable code, where the processor executable code, upon execution by the processor, causes the processor to receive the one or more signals from the one or more sensors and to determine an estimate of the wavefront tilt based on a combination of the wavefront errors determined for the Rayleigh-scattered and Raman-scattered components.

In one example embodiment, the system further includes an adaptive optics subsection coupled to the processor; the adaptive optics subsection includes deformable optical components that are configured to deform in response to formation signals from the processor based on the estimate of the wavefront tilt. In another example embodiment, the system further includes an adaptive optics subsection coupled to the processor, where the adaptive optics subsection includes movable optical components that are configured to move in response to signals from the processor based on the estimate of the wavefront tilt.

According to another example embodiment, the one or more sensors include a Shack-Hartmann wavefront sensor, a tilt-tip wavefront sensor or a pyramid wavefront sensor. In still another example embodiment, an output wavelength of the one or more laser devices is in an ultraviolet region of electromagnetic radiation. In yet another example embodiment, the one or more laser devices include at least two laser devices, each operating at a distinct wavelength. In one example embodiment, the one or more sensors include a wavefront sensor and a plurality of tip-tilt sensors.

Some of the disclosed devices or modules can be implemented as hardware, software, or combinations thereof. For example, a hardware implementation of electronic devices can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that are known in the art, including, but not limited to, communications over the Internet, wired, or wireless networks using the appropriate protocols.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

The invention claimed is:

1. A method for determining wavefront tilt in a system that utilizes a laser guide star, comprising:
projecting one or more laser beams in a direction of an object of interest, each laser beam forming a Rayleigh-Raman polychromatic laser guide star (RRPLGS);
receiving light associated with the one or more laser beams after undergoing Rayleigh and Raman scattering through a region of atmosphere;
separating spectral components of the received scattered light to obtain at least one Rayleigh-scattered component and at least one Raman-scattered component;
using one or more sensors to determine a wavefront error associated with the at least one Rayleigh-scattered component and the at least one Raman-scattered component; and
determining an estimate of the wavefront tilt based on a combination of the wavefront errors determined for the Rayleigh-scattered and the Raman-scattered components.

2. The method of claim 1, wherein:
separating the spectral components results in obtaining at least two Raman-scattered components, and
determining the estimate of the wavefront tilt includes using the wavefront errors determined for each of the Rayleigh-scattered component and the at least two Raman-scattered components.

3. The method of claim 1, comprising:
projecting more than one laser beam in the direction of the object of interest, wherein each laser beam is associated with a corresponding Rayleigh scattering wavelength and one or more Raman scattering wavelengths;
receiving light associated with each laser beam after undergoing Rayleigh and Raman scattering through the region of atmosphere;
separating spectral components of the received scattered light to obtain a plurality of Rayleigh-scattered components and a plurality of Raman-scattered components;
using the one or more sensors to determine wavefront errors associated with each of the Rayleigh-scattered and the Raman-scattered components; and
determining the estimate of the wavefront tilt based on a combination of the wavefront errors determined for each of the Rayleigh-scattered and Raman-scattered components.

4. The method of claim 1, wherein the one or more sensors includes a Shack-Hartmann wavefront sensor, a tilt-tip wavefront sensor or a pyramid wavefront sensor.

5. The method of claim 1, wherein an output wavelength of the one or more laser beams is selected to be in the range spanning the ultraviolet to infrared region of electromagnetic radiation.

6. The method of claim 1, wherein an output wavelength of the one or more laser beams is in an ultraviolet region of electromagnetic radiation.

7. The method of claim 1, wherein:
a variance of the estimated tilt error is determined according to the following relationship:

$$\sigma^2_{est,L,i} = \sigma^2_{diff,L,i}\left(\frac{n(\lambda_o)-1}{n(\lambda_{L,1,i})-n(\lambda_{L,2,i})}\right)^2,$$

where, n is the refractive index, $\lambda_o$ is the wavelength of observation, i is the $i^{th}$ measurement of the tilt at $\lambda_o$, $\sigma_{est,L,i}^2$ is the variance of the $i^{th}$ tilt measurement at the wavelength of observation for the $L^{th}$ laser beam in units of radians squared of angular error (radians squared of wavefront angle), $\lambda_{L,1,i}$ is the wavelength of the Rayleigh-scattered component for the $L^{th}$ laser beam in the $i^{th}$ tilt measurement, $\lambda_{L,2,i}$ is the wavelength of the Raman-scattered component for the $L^{th}$ laser beam in the $i^{th}$ tilt measurement, and $\sigma_{diff,L,i}^2$ is the variance corresponding to the $i^{th}$ differential tilt for the $L^{th}$ laser, where the differential tilt is the difference between the measured tilt at the $\lambda_{L,2,i}$ and $\lambda_{L,1,i}$ wavelengths.

8. The method of claim 1, wherein separating the spectral components includes directing the received scattered light to one or more beam splitters, each beam splitter configured to allow one component of the received scattered light to be deflected away from the remaining portions of the received scattered light.

9. The method of claim 1, wherein separating the spectral components includes using one or more narrow band filters, each narrow band filter allowing only one of the spectral components to pass therethrough.

10. The method of claim 1, further comprising providing the estimate of the wavefront tilt to an adaptive optics system to effectuate a wavefront correction and to allow formation of an improved image of the object of interest.

11. The method of claim 1, wherein the estimate of the wavefront tilt compensates for at least a portion of turbulence of the atmosphere.

12. The method of claim 1, wherein the one or more laser beams include at least two laser beams that are produced using separate laser devices, each operating at a distinct wavelength.

13. The method of claim 1, further including using an additional laser device for augmenting a power of the one or more laser beams, wherein the additional laser device is configured to operate at the same wavelength of one of the one or more laser beams.

14. A system for determining wavefront tilt, comprising:
one or more laser devices configured to project one or more laser beams in a direction of an object of interest and to form one or more Rayleigh-Raman polychromatic laser guide stars (RRPLGSs);
a telescope configured to receive light associated with the one or more laser beams after undergoing Rayleigh and Raman scattering through a region of atmosphere;
one or more filters or beam splitters positioned to receive at least a portion of the received scattered light and to separate spectral components of the received scattered light to obtain at least one Rayleigh-scattered component and at least one Raman-scattered component;
one or more sensors positioned to receive the at least one Rayleigh-scattered component and the at least one Raman-scattered component, and to produce one or more signals indicative of a wavefront error associated with the at least one Rayleigh-scattered component and at least one Raman-scattered component;
a processor and a memory comprising processor executable code, the processor executable code, upon execution by the processor, causing the processor to:
receive the one or more signals from the one or more sensors and to determine an estimate of the wavefront tilt based on a combination of the wavefront errors determined for the Rayleigh-scattered and Raman-scattered components.

15. The system of claim 14, further comprising an adaptive optics subsection coupled to the processor, the adaptive optics subsection including deformable optical components that are configured to deform in response to formation signals from the processor based on the estimate of the wavefront tilt.

16. The system of claim 14, further comprising an adaptive optics subsection coupled to the processor, the adaptive optics subsection including movable optical components that are configured to move in response to signals from the processor based on the estimate of the wavefront tilt.

17. The system of claim 14, wherein the one or more sensors include a Shack-Hartmann wavefront sensor, a tilt-tip wavefront sensor or a pyramid wavefront sensor.

18. The system of claim 14, wherein an output wavelength of the one or more laser devices is in an ultraviolet region of electromagnetic radiation.

19. The system of claim 14, wherein the one or more laser devices include at least two laser devices, each operating at a distinct wavelength.

20. The system of claim 14, wherein the one or more sensors includes a wavefront sensor and a plurality of tip/tilt sensors.

* * * * *